United States Patent Office 3,641,072
Patented Feb. 8, 1972

3,641,072
PRODUCTION OF SULFITOBETAINES
Harry Distler, Ludwigshafen, and Rudi Widder, Eppelheim, Germany, assignors to Badische Anilin- & Soda-Fabrik Aktiengesellschaft, Ludwigshafen (Rhine), Germany
No Drawing. Filed May 8, 1969, Ser. No. 823,160
Claims priority, application Germany, May 10, 1968,
P 17 68 407.0; Aug. 14, 1968, P 17 93 191.8
Int. Cl. C07c *143/90;* C11d *1/28*
U.S. Cl. 260—401                         9 Claims

ABSTRACT OF THE DISCLOSURE

Production of sulfitobetaines by reaction of amines with 1,2-glycol sulfites and the new sulfitobetaines themselves. The new products are valuable starting materials for the production of dyes, detergents, wetting agents, finishes and auxiliaries in the textile dyeing and printing fields, and for the production of pesticides.

---

This invention relates to the production of sulfitobetaines by the reaction of amines with 1,2-glycol sulfites and to the substances thus obtained.

It is an object of this invention to provide a new process for the production of sulfitobetaines in good yields and high purity using simple starting materials.

Another object of the invention is to provide new sulfitobetaines.

These and other objects of the invention are achieved and sulfitobetaines having the general formula:

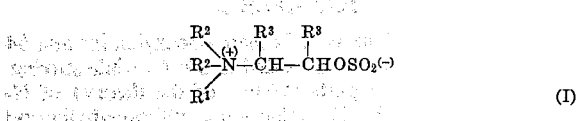

$$R^2-\overset{R^3}{\underset{R^1}{\overset{(+)}{N}}}-\overset{R^3}{CH}-CHOSO_2^{(-)} \quad (I)$$

where the radicals $R^1$, $R^2$, $R^3$ may be identical or different and each denotes an aliphatic, cycloaliphatic, araliphatic or aromatic radical, individual radicals $R^2$ and/or $R^3$ may denote a hydrogen atom, and $R^1$ and one radical $R^2$, or $R^1$ and the pair of radicals $R^2$, may together with the adjacent nitrogen atom be members of a heterocyclic ring, and/or salts having the general formula:

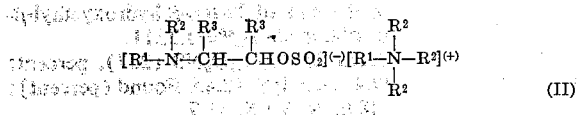

$$\{[R^1-\overset{R^3}{\underset{R^2}{N}}-\overset{R^3}{CH}-CHOSO_2]^{(-)}[R^1-\overset{R^2}{\underset{R^2}{N}}-R^2]^{(+)}\} \quad (II)$$

where $R^1$, $R^2$ and $R^3$ have the above meanings are obtained advantageously by reacting a primary, secondary or tertiary amine having the general formula:

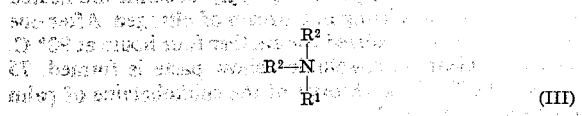

$$R^2-\overset{R^2}{\underset{R^1}{N}} \quad (III)$$

where $R^1$ and $R^2$ have the above meanings with a 1,2-glycolsulfite having the general formula:

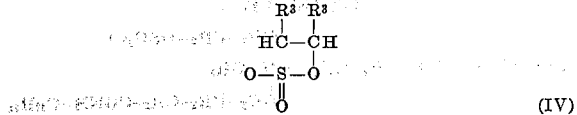

$$\begin{array}{c} R^3 \; R^3 \\ | \; \; | \\ HC-CH \\ | \; \; \; \; | \\ O-S-O \\ \| \\ O \end{array} \quad (IV)$$

where $R^3$ has the above meaning.

When triethanolamine and 1,2-glycol sulfite are used, the reaction may be represented by the following equation:

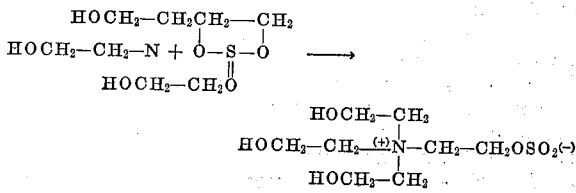

$$\begin{array}{c} HOCH_2-CH_2CH_2-CH_2 \\ | \; \; \; \; \; \; \; \; \; | \\ HOCH_2-CH_2-N + O-S-O \\ | \; \; \; \; \; \; \; \; \; \; \; \; \| \\ HOCH_2-CH_2 \; \; \; \; O \end{array} \longrightarrow$$

$$\begin{array}{c} HOCH_2-CH_2 \\ | \\ HOCH_2-CH_2\overset{(+)}{N}-CH_2-CH_2OSO_2^{(-)} \\ | \\ HOCH_2-CH_2 \end{array}$$

The process according to the invention surprisingly yields a large number of sulfitobetaines (starting from simple starting materials) in good yields and high purity.

The amines used as starting materials and having the general Formula III may be primary, secondary or tertiary. Preferred starting materials (III) and consequently preferred end products (I) are those in whose formulae the individual radicals $R^1$ and $R^2$ are identical or different and each denotes an alkyl, alkenyl, alkynyl, cycloalkyl, aralkyl or aryl radical having up to twenty-two, preferably up to eighteen, carbon atoms, or the radicals $R^2$ may each denote a hydrogen atom, $R^1$ and one radical $R^2$, or $R^1$ and the pair of radicals $R^2$, together with the adjacent nitrogen atom may also be members of a saturated or unsaturated heterocyclic ring having three, five or six members which may contain, in addition to the nitrogen atom, an oxygen atom or another nitrogen atom and which if desired may have a phenyl ring attached thereto. The said radicals or the heterocyclic ring may bear (as substituents) groups and/or atoms which are inert under the reaction conditions, for example hydroxy groups, alkyl groups having up to four carbon atoms, chlorine atoms, bromine atoms, sulfo groups, nitro groups or cyano groups. When mixtures of starting materials (III) are used, for example the palm oil amine mixture obtained by reaction of dimethylamine with lauryl chloride and consisting substantially of amines having twelve to fourteen carbon atoms, corresponding mixtures of sulfitobetaines are obtained. For example the following amines may be used as starting materials (III): butylamine, dodecylamine, cetylamine, stearylamine, cyclohexylamine, aniline, α- or β-naphthylamine, benzylamine, allylamine, propargylamine, ethylenimine, diethylamine, diethanolamine, dibutylamine, di-(2-ethylhexyl)-amine, methylaniline, diallylamine, methylbenzylamine, piperazine, trimethylamine, triethylamine, tributylamine, dimethyldodecylamine, dimethylstearylamine, distearylmethylamine, dimethylaniline, dimethylcyclohexylamine, triethanolamine, triisopropanolamine, pyridine, quinoline, quinaldine and imidazole.

Starting materials (III) include also primary, secondary or tertiary amines having the general Formula III in which the radicals $R^2$ and $R^1$ are identical or different and one, two or all of the radicals $R^2$ and $R^1$ may denote an alkyl radical bearing (as substituents) aliphatic radicals on one or more carbon atoms by way of groups —S—, $$-\underset{\underset{O}{\|}}{C}-O- \text{ and/or } -\underset{\underset{O}{\|}}{C}-NH$$

End products prepared from such starting materials (III) and having the Formula I and/or II have equivalent meanings for $R^2$ and $R^1$. Preferred starting materials (III) and consequently preferred end products (I) also include those in whose formulae at least one and preferably one or two of the individual radicals $R^2$ and $R^1$ each denotes an alkyl radical having one to twelve, particularly one to four, carbon atoms bearing (as a substituent) an alkyl radical, alkenyl radical or alkynyl radical each having up to eighteen, particularly up to twelve, preferably up to four, carbon atoms attached to a carbon atom by way of a group —S—,

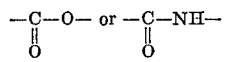

The said radicals may also bear (as substituents) groups and/or atoms which are inert under the reaction conditions, for example hydroxy groups, chlorine atoms, bromine atoms, nitro groups, sulfo groups, alkyl groups having up to four carbon atoms or cyano groups.

For example the following amines may be used as starting materials (III): N-stearylamidoethylpropylamine, N,N - bis - (stearylamidoethyl) - propylamine, N-(stearylamidoethyl) - N - (acetamidopropyl) - propylamine, N,N, N - tris - (laurylamidobutyl)-propylamine, N-isopropyllauratopropylamine, N,N - bis - (butylacetato)-propylamine, N - ethylstearato - N,N-bis-(stearylamidoethyl)-propylamine, N - butynylthiomethylpropylamine, N,N-bis-(propenylthiothyl) - propylamine or N-($\alpha,\beta$-diacetato)-propylamine; corresponding amines bearing an allyl, butyl, cyclohexyl, phenyl or benzyl group as substituents on the nitrogen atom; N,N-diethanol-N-acetatoethylamine and N-ethylacetatopiperazine.

The strating material (III) is reacted with a 1,2-glycol sulfite having the general Formula IV, generally in a stoichiometric amount. The starting amine (III), particularly in the case of a primary amine, may also be used in excess, for example in an excess of once to twice with reference to starting material (IV). The starting material (IV) may be prepared for example by reaction of ethylene oxide with sulfur dioxide by the method described in German Pat. No. 1,251,769.

Compounds which form 1,2-glycol sulfites during the reaction (for example poly-1,2-glycol sulfites) may also be used for the reaction. Polyglycol sulfites are obtained for example by reacting ethylene oxide with sulfur dioxide at 0° C.

Preferred starting materials (IV) and accordingly preferred end products (I) are those in whose formulae the individual radicals $R^3$ are identical or different and each denotes a hydrogen atom or an alkyl, cycloalkyl, aralkyl or aryl radical having up to seven carbon atoms. The individual radicals $R^3$ may be identical to or different from the radical $R^1$ and/or the individual radicals $R^2$. For example the following 1,2-glycol sulfites may be used as starting materials (IV): 1,2-glycol sulfite, 1-methyl-1,2-glycol sulfite, 2-phenyl-1,2-glycol sulfite, 1-cyclohexyl-1,2-glycol sulfite, 2-benzyl-1,2-glycol sulfite and 1,2-dimethyl-1,2-glycol sulfite.

Sulfitobetaines (I) prepared by the process according to the invention may be converted during the reaction or during processing of the reaction mixture into their salts having the general formula (II). As a rule sulfitobetaines (I) are obtained as end products when tertiary amines are used, the end product (I) or (II) or a mixture of the same, for example in the ratio of 1 mole of end product (I) to one mole of end product (II), is obtained when a secondary amine is used, and as a rule end products (II) are obtained after the reaction mixture has been worked up when primary amines are used.

The reaction is as a rule carried out at a temperature of from —10° to +200° C., preferably from 20° to 150° C., at atmospheric or superatmospheric pressure, continuously or in batches. It is advantageous to use a solvent which is inert under the reaction conditions such as water; alcohols, for example methanol, butanol or cyclohexanol; aromatic hydrocarbons, for example benzene, toluene, xylene, nitrobenzene or chlorobenzene; ketones, for example acetone; chlorohydrocarbons, for example chloroform or ethylene chloride; or mixtures of the same.

The reaction may be carried out as follows: a mixture of the starting materials (III) and (IV) with or without a solvent is kept for thirty minutes to six hours at the reaction temperature. The end product is then separated from the reaction mixture by a conventional method, for example by filtration or fractional distillation.

The new compounds which can be prepared according to the process are valuable starting materials for the production of dyes, detergents, wetting agents, finishes and auxiliaries for the textile dyeing and printing fields and also for the production of pesticides. For example the reaction product of N,N-distearyl-N-methylamine and glycol sulfite or the end products of Examples 5 to 18 may be used in an amount of from 10 to 40 grams per liter of aqueous finishing liquor for impregnating cotton, rayon staple fiber or viscose cloth or appropriate yarns which are then dried so that a soft, smooth and full hand is imparted thereto. This treatment may be combined with washing, wetting, finishing or dyeing yarns or cloth prepared therefrom, so that the products of the process in many cases also have a favourable influence on the other said opertions.

The invention is illustrated by the following examples. The parts specified in the examples are parts by weight.

EXAMPLE 1

A solution of 99 parts of cyclohexylamine and 20 parts of water in 150 parts of methanol is slowly added to 54 parts of 1,2-glycol sulfite. After the mixture has been stirred for a short time a strongly exothermic reaction sets in and the temperature is kept at 80° C. by cooling. The colorless solid precipitated is suction filtered and recrystallized from alcohol. 150 parts (98.0% of the theory) of N - cyclohexyl - N - ethyl - $\beta$ - sulfitocyclohexyl ammonium sulfite having a melting point (with decomposition) of 305° C. is obtained.

*Analysis.*—Calculated for $C_{14}H_{30}O_3N_2S$ (306), percent: C, 55.0; H, 9.8; O, 15.7; N, 9.2; S, 10.3. Found (percent): C, 54.2; H, 10.2; O, 15.6; N, 9.9; S, 10.1.

EXAMPLE 2

A mixture of 121 parts of N-methylbenzylamine and 54 parts of 1,2-glycol sulfite is heated to 80° C. while stirring. Five hours later 115 parts (96.0% of the theory) of N-methyl - N - benzyl - N - ethyl - $\beta$ - sulfitomethylbenzyl ammonium sulfite is obtained as a water-soluble yellow oil. $n_D^{20}=1.5534$

*Analysis.*—Calculated for $C_{18}H_{26}O_3N_2S$ (350), percent: C, 61.7; H, 7.45; O, 13.7; N, 8.0; S, 9.15. Found (percent): C, 61.4%; H, 7.7; O, 14.2; N, 6.8; S, 9.5.

EXAMPLE 3

A mixture of 74.5 parts of triethanolamine and 54 parts of glycol sulfite is stirred for five hours at 70° C. 119 parts (93.0% of the theory) of N-tris-$\beta$-hydroxyethyl-$\beta$-sulfitoethylbetaine is obtained. $n_D^{40}=1.5211$.

*Analysis.*—Calculated for $C_8H_{19}O_6NS$ (257), percent: C, 37.4; H, 7.4; O, 37.4; N, 5.4; S, 12.45. Found (percent): C, 38.0; H, 7.9; O, 38.6; N, 5.3 S, 11.7.

EXAMPLE 4

53 parts of dimethyl palm oil amine (prepared by reaction of 205 parts of lauryl chloride with 45 parts of dimethylamine) and 27 parts of polyglycol sulfite are heated at 130° C. while stirring in a stream of nitrogen. After one hour the mixture is stirred for another four hours at 90° C. so that a clear water-soluble yellow paste is formed. 75 parts (94.0% of the theory) of the sulfitobetaine of palm oil amine is obtained.

*Analysis.*—Calculated for $C_{16}H_{35}O_3NS$ (321), percent: C, 60.0; H, 11.9; O, 15.0; N, 4.3; S, 9.9. Found (percent): C, 58.9; H, 11.0; O, 11.0; N, 3.8; S, 9.0.

EXAMPLE 5

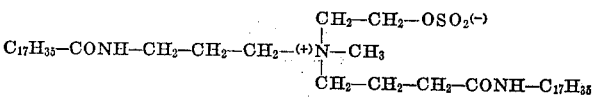

(a) 1108 parts of stearic acid is melted at 70° C. Under an atmosphere of nitrogen 290 parts of N-methyldipropylenetriamine is allowed to flow in. While stirring the mixture is slowly heated up to 170° to 180° C. and kept at this temperature for six hours. The water formed in the reaction distils off and is collected in a receiver (about 70 parts). 1320 parts (99.5% of the theory) of N-methyl-N-bis-(3-stearamidopropyl)-amine is obtained as a pale brown, hard mass.

(b) 32.5 parts of glycol sulfite is slowly added under nitrogen at 95° C. to 203 parts of a melt of N-methyl-N-bis-(3-stearamidopropyl)-amine. The mixture is further stirred for another four hours at 130° C.

The yield is 232 parts (98.6 of the theory) of N-methyl-N,N-di-(3-stearamidopropyl)-β-sulfitoethylbetaine).

EXAMPLE 6

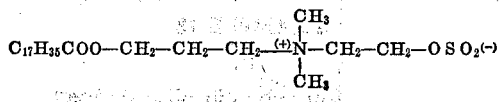

(a) 296 parts of methyl stearate is melted at 50° C. under an atmosphere of nitrogen. 4 parts of aluminum isopropylate and 89 parts of N,N-dimethylethanolamine are added while stirring. The mixture is heated up to 195° C. in the course of fifteen hours and at the same time the methanol formed is distilled off over a 20 cm. column with reflux. 333 parts (93.5% of the theory) of β-N,N-dimethylaminoethyl stearate is obtained as a yellow oil.

(b) 89 parts of β-N,N-dimethylaminoethyl stearate has 27 parts of glycol sulfite added to it at 80° C. under nitrogen, and the whole is stirred for six hours at 110° C. The water-soluble end product is obtained which crystallizes upon cooling.

The yield is 112 parts (96.5% of the theory) of N,N-dimethyl-N-ethylstearato - β - sulfitoethylbetaine. Melting point: 67° to 69° C. (recrystallized from ethanol).

EXAMPLE 7

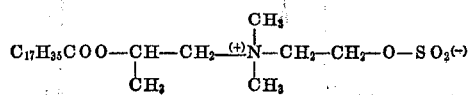

297 parts of methyl stearate, 103 parts of N,N-dimethylisopropanolamine and 6 parts of aluminum isopropylate are heated to 210° C. in the course of seven hours as described in Example 2. 356 parts (96.3% of the theory) of β-N,N-dimethylaminoethyl stearate is obtained as a yellow oil.

147.5 parts of β-N,N-dimethylaminoethyl stearate is heated with 43 parts of glycol sulfite for four hours at 130° C. as described in Example 2(b). A brown solid is obtained which is recrystallized from alcohol. The yield is 188 parts (99.3% of the theory) of N,N-dimethyl-N-isopropylstearato-β-sulfitoethylbetaine. The melting point is from 72° to 73° C.

EXAMPLE 8

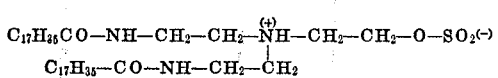

103 parts of diethylenetriamine is added to 544 parts of stearic acid (which has been melted at 70° C.) while at the same time passing in nitrogen. The mixture is heated in the course of ninety minutes to 175° C. and kept at this temperature for five hours, the water of reaction formed being distilled off. The yield is 605 parts (97.5% of the theory) of starting material (III). 158 parts of starting material (III) and 27 parts of glycol sulfite are reacted for five hours at from 80° to 90° C. as described in Example 2. The yield is 183 parts (97.8% of the theory) of N,N-bis-(stearamidoethyl)-β-sulfitoethylbetaine; melting point from 85° to 87° C.

EXAMPLE 9

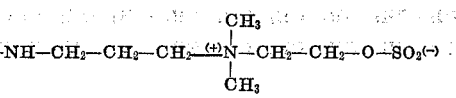

596 parts of methyl stearate is melted and 204 parts of N,N-dimethylpropylenediamine is added to the melt under nitrogen. The reaction mixture is boiled under reflux for two hours while stirring and then the methanol formed is distilled off in the course of six hours with a rise in temperature to 180° C. A brown viscous oil is obtained which slowly solidifies. The yield is 730 parts (99.3% of the theory) of starting material (III).

368 parts of starting material (III) is heated with 108 parts of glycol sulfite for two hours at 110° C. A crystalline brown product is formed upon cooling.

The yield is 470 parts (98.8% of the theory) of N,N-dimethyl-N-stearamidopropyl-β-sulfitoethylbetaine.

$C_{25}H_{52}O_4N_2S$ (476).—Calculated (percent): C, 63.0; H, 10.9; O, 13.45; N, 5.88; S, 6.72. Found (percent): C, 62.5; H, 11.0; O, 14.6; N, 5.9; S, 6.3.

EXAMPLE 10

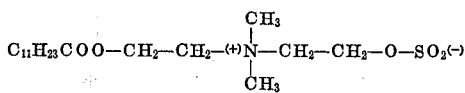

200 parts of lauric acid is melted under nitrogen. 134 parts of N,N-dimethylethanolamine is added while stirring and the mixture is heated to 170° C. Four hours later the water of reaction begins to distil off through a descending condenser, and the temperature rises in the course of twelve hours to from 180° to 200° C. 268 parts (99.0% of the theory) of β-N,N-dimethylaminoethyl laurate is obtained in the form of a brown oil.

162 parts of β-N,N-dimethylaminoethyl laurate is stirred with 65 parts of glycol sulfite for four hours at 80° C. 220 parts (96.8% of the theory) of N,N-dimethyl-N-ethyllaurato-β-sulfitoethylbetaine is obtained in the form of a yellow paste.

$C_{18}H_{37}O_5NS$ (379).—Calculated (percent): C, 57.1; H, 9.75; O, 21.1; N, 3.7; S, 8.43. Found (percent): C, 57.7; H, 10.2; O, 21.4; N, 3.6; S, 6.5.

EXAMPLE 11

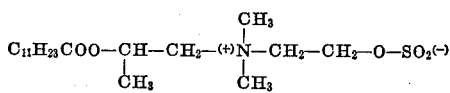

300 parts of lauric acid and 154 parts of N,N-dimethyl isopropanolamine are reacted as described in Example 6. The yield is 384 parts of β-N,N-dimethylaminoisopropyl laurate in the form of a red oil.

142 parts of β-N,N-dimethylaminoisopropyl laurate and 54 parts of glycol sulfite are stirred for four hours at from 100° to 130° C. A brown viscous oil is obtained. The yield is 190 parts (96.8% of the theory) of N,N-dimethyl-N-isopropyllaurato-β-sulfitoethylbetaine. $n_D^{20}=1.4654$.

EXAMPLE 12

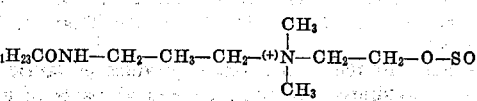

400 parts of lauric acid and 204 parts of N-dimethylpropylenediamine are reacted as described in Example 6. The yield is 556 parts (97.8% of the theory) of lauric acid (N,N-dimethylamino)-propylamide.

184 parts of lauric acid (N,N-dimethylamino)-propylamide and 108 parts of glycol sulfite are reacted for two hours at 100° C. while stirring. 385 parts (98.3% of the theory) of N,N - dimethyl - N - lauramidopropyl-β-sulfitoethylbetaine is obtained in the form of a yellow paste. $n_D^{50}=1.4938$.

EXAMPLE 13

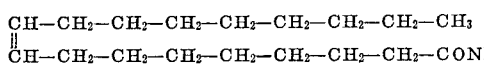

282 parts of oleic acid and 102 parts of N,N-dimethylpropylenediamine are reacted at 260° C. in the course of twelve hours as described in Example 6. The yield is 355 parts (97.1% of the theory) of oleic acid (gamma-N,N-dimethylamino)-propylamide in the form of a brown oil.

183 parts of oleic acid (gamma-N,N-dimethylamino)-propylamide and 54 parts of glycol sulfite are reacted at 100° C. for five hours while stirring. 230 parts (97.0% of the theory) of N,N-dimethyl-N-oleamidopropyl-β-sulfitoethylbetaine is obtained in the form of a brown paste.

$C_{25}H_{50}O_4N_2S$ (474).—Calculated (percent): C, 63.3; H, 10.55; N, 5.9; S, 6.74. Found (percent): C, 63.2; H, 10.7; N, 5.5; S, 5.9.

EXAMPLE 14

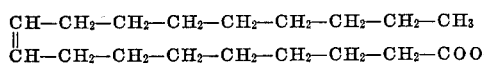

422 parts of oleic acid and 134 parts of N,N-dimethylethanolamine are reacted at a temperature of 170° C. as described in Example 6. The yield is 496 parts (99.1% of the theory) of β-N,N-dimethylaminoethyl oleate in the form of a red oil.

141 parts of β-N,N-dimethylaminoethyl oleate and 43 parts of glycol sulfite are reacted at 100° C. for six hours while stirring. 454 parts (98.5% of the theory) of N,N-dimethyl-N-ethyloleato-β-sulfitoethylbetaine is obtained in the form of a yellow water-soluble paste.

$C_{24}H_{47}O_5NS$ (461).—Calculated (percent): C, 62.5; H, 10.7; O, 17.3; N, 3.00; S, 6.90. Found (percent): C, 63.9; H, 10.7; O, 17.0; N, 2.8; S, 5.1.

EXAMPLE 15

CH—CH₂—CH₂—CH₂—CH₂—CH₂—CH₂—CH₂—CH₃
‖
CH—CH₂—CH₂—CH₂—CH₂—CH₂—CH₂—CH₂—COO—CH—CH₂—⁽⁺⁾N(CH₃)—CH₂—CH₂—O—SO₂⁽⁻⁾
                                              |
                                              CH₃

422 parts of oleic acid and 154 parts of N,N-dimethylisopropanolamine are reacted at a temperature of 170° C. as described in Example 6. The yield is 500 parts (90.8% of the theory) of α-N,N-dimethylaminoisopropyl oleate.

183 parts of α-N,N-dimethylaminoisopropyl oleate and 54 parts of glycol sulfite are reacted for six hours at 140° C. while stirring. A red water-soluble oil is obtained. The yield is 230 parts (97.0% of the theory) of N,N-dimethyl-N-isopropyloleato-β-sulfitoethylbetaine. $n_D^{20}=1.4727$.

EXAMPLE 16

$(C_{11}H_{23}-CONH-CH_2-CH_2-CH_2)_2-^{(+)}N-CH_2-CH_2-O-SO_2^{(-)}$
                                        |
                                        CH₃

400 parts of lauric acid and 145 parts of N-methyldipropylenetriamine are reacted analogously to Example 4. The condensation product is recrystallized from alcohol. The yield is 500 parts (98.2% of the theory), M.P. 72–73° C.

204 parts of the condensation product of lauric acid and N-methyldipropylenetriamine and 43 parts of glycol sulfite are reacted for six hours at 130° C. while stirring. 241 parts (97.6% of the theory) of N-methyl-N,N-bis-lauramidopropyl)-β-sulfitoethylbetaine is obtained in the form of a yellow water-soluble paste.

EXAMPLE 17

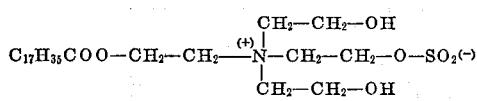

800 parts of stearic acid and 400 parts of triethanol-

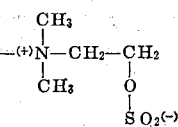

amine are condensed at 150° C. as described in Example 6. 1100 parts (99.2% of the theory) of β-N,N-diethanolaminoethyl stearate is obtained.

207 parts of β-N,N-diethanolaminoethyl stearate and 54 parts of glycol sulfite are reacted for fifteen hours at 95° C. while stirring. 254 parts (97.3% of the theory) of N,N-diethanolamino-N-ethylstearato-β-sulfitoethylbetaine is obtained in the form of a yellow solid product.

EXAMPLE 18

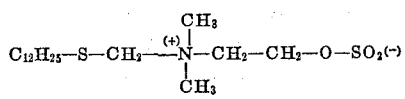

62 parts of the thioether prepared from dodecylmercaptan, formaldehyde and dimethylamine by the process described in German Pat. No. 820,005 and 26 parts of glycol sulfite are reacted for eight hours at 100° C. while stirring. 81 parts (94.3% of the theory) of N,N-dimethyl-N-dodecylthiomethyl-β-sulfitoethylbetaine is obtained in the form of a yellowish paste. $n_D^{50}=1.4735$.

What we claim is:

1. A process for the production of sulfitobetaines having the general formula:

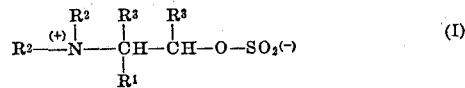

where individual radicals R¹, R² and R³ may be identical or different and each denotes an aliphatic, cycloaliphatic, araliphatic or aromatic radical, the individual radicals R² and/or R³ may also each denote a hydrogen atom, and/or salts having the general formula:

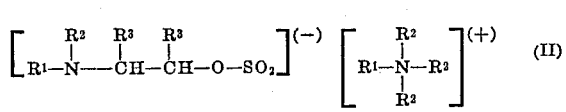

where R¹, R² and R³ have the above meanings, wherein a primary, secondary or tertiary amine having the general formula:

where R¹ and R² have the above meanings is reacted with a 1,2-glycol sulfite having the general formula:

where R³ has the above meaning.

2. A sulfitobetaine having the general formula:

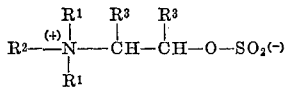

where the individual radicals $R^1$, $R^2$ and $R^3$ may be identical or different and each denotes an aliphatic, cycloaliphatic or aromatic radical, and the individual radicals $R^2$ and/or $R^3$ may also denote a hydrogen atom.

3. A salt having the general formula:

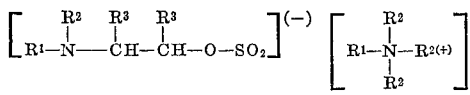

where $R^1$, $R^2$ and $R^3$ have the meanings given in claim 2.

4. A sulfobetaine as claimed in claim 2 wherein at least one of the individual radicals $R^2$ and $R^1$ in its meaning as an aliphatic radical represents in the end product an alkyl radical bearing an aliphatic radical as a substituent attached by way of a group —S—,

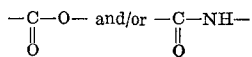

5. A process as claimed in claim 1 wherein at least one of the individual radicals $R^2$ and $R^1$ in its meaning as an aliphatic radical represents in the end products (I) and/or (II) and in the starting material (III) an alkyl radical bearing an aliphatic radical as a substituent attached by way of one of the groups —S—,

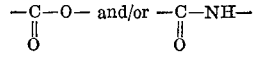

6. A process as claimed in claim 1 carried out with a poly-1,2-glycol sulfite as starting material (IV).

7. A process as claimed in claim 1 carried out at a temperature of from $-10°$ C. to $+200°$ C.

8. A process as claimed in claim 1 carried out at a temperature of from $20°$ C. to $150°$ C.

9. A process as claimed in claim 1 carried out in the presence of an inert solvent.

References Cited
UNITED STATES PATENTS 3,225,073  12/1965  Leverkusen et al. ____ 260—401
3,280,179  10/1966  Ernst _____ 260—501

ELBERT L. ROBERTS, Primary Examiner

U.S. Cl. X.R.

260—583, 584

PO-1050
(5/69)

UNITED STATES PATENT OFFICE
CERTIFICATE OF CORRECTION

Patent No. 3,641,072  Dated February 8, 1972

Inventor(s) Harry Distler and Rudi Widder

It is certified that error appears in the above-identified patent and that said Letters Patent are hereby corrected as shown below:

Column 1, lines 66-71,
"
$$\begin{array}{cc} R^3 & R^3 \\ | & | \\ HC & CH \\ | & | \\ O\text{-}S\text{-}O \\ \| \\ O \end{array}$$
" should read --
$$\begin{array}{cc} R^3 & R^3 \\ | & | \\ HC & CH \\ | & | \\ O\text{-}S\text{-}O \\ \| \\ O \end{array}$$ --.

Column 2, lines 5-8, "
$$\begin{array}{c} HOCH_2\text{-}CH_2\ CH_2\text{-}CH_2 \\ | \quad\quad | \\ HOCH_2\text{-}CH_2\text{-}N\text{+}O\text{-}S\text{-}O \\ | \quad\quad \| \\ HOCH_2\text{-}CH_2\quad\quad O \end{array}$$
" should read --
$$\begin{array}{cc} HOCH_2\text{-}CH_2 & CH_2\text{-}CH_2 \\ | & | \\ HOCH_2\text{-}CH_2\text{-}N \quad + \quad O\text{-}S\text{-}O \\ | & \| \\ HOCH_2\text{-}CH_2 & O \end{array}$$ --.

Column 3, line 25, "strating" should read -- starting --.

Column 6, line 63, that portion of the formula reading "CH$_2$-CH$_3$-CH$_2$" should read -- CH$_2$-CH$_2$-CH$_2$ --.

Column 9, line 2, claim 2, "
$$\begin{array}{c} R^1 R^3\ R^3 \\ (+)\,|\ \ |\ \ | \\ R^2\text{-}N\text{-}CH\text{-}CH\text{-}O\text{-}SO_2(-) \\ | \\ R^1 \end{array}$$
" should read

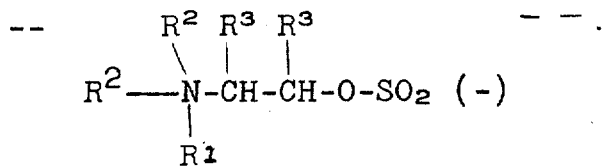

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents